United States Patent
Jordan

(10) Patent No.: US 7,554,485 B2
(45) Date of Patent: Jun. 30, 2009

(54) RADAR SENSOR AND METHOD FOR DISTANCE AND CRUISE CONTROL

(75) Inventor: Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/664,025

(22) PCT Filed: Jul. 7, 2005

(86) PCT No.: PCT/EP2005/053244

§ 371 (c)(1),
(2), (4) Date: Mar. 27, 2007

(87) PCT Pub. No.: WO2006/034886

PCT Pub. Date: Apr. 6, 2006

(65) Prior Publication Data

US 2008/0106459 A1   May 8, 2008

(30) Foreign Application Priority Data

Sep. 28, 2004 (DE) .................. 10 2004 046 873

(51) Int. Cl.
G01S 13/66 (2006.01)
G01S 13/93 (2006.01)
G01S 7/41 (2006.01)

(52) U.S. Cl. .................. 342/90; 342/70; 342/94

(58) Field of Classification Search ............ 342/70–72, 342/90, 192, 196, 94–97; 701/117–119, 701/300–302

See application file for complete search history.

(56) References Cited

U.S. PATENT DOCUMENTS 5,752,215 A * 5/1998 Zaaiman et al. ............ 701/117
7,046,192 B2 * 5/2006 Nagel ........................ 342/192
7,116,265 B2 * 10/2006 Shu et al. .................. 342/25 R
7,289,060 B1 * 10/2007 Abatzoglou et al. ........... 342/90
7,345,621 B2 * 3/2008 Bourdelais et al. ............ 342/90
7,385,550 B2 * 6/2008 Winter et al. ................. 342/70
2003/0174054 A1   9/2003 Shimomura
2005/0024258 A1 * 2/2005 Matsuoka et al. ............. 342/70

(Continued)

FOREIGN PATENT DOCUMENTS

EP    1 094 336    4/2001

(Continued)

OTHER PUBLICATIONS

Robert Bosch GmbH, "Adaptive Fahrgeschwindigkeitsregelung ACC" (English translation of title: Adaptive Cruise Control ACC), Apr. 2002, (ISBN-3-7782-2034-9).

*Primary Examiner*—Thomas H Tarcza
*Assistant Examiner*—Cassi Galt
(74) *Attorney, Agent, or Firm*—Kenyon & Kenyon LLP

(57) ABSTRACT

A radar sensor and a corresponding method for distance and cruise control of a vehicle are described; using this sensor and method, objects in front of the vehicle in the direction of travel are detected and at least the variables: distance, relative velocity, and azimuth angle of the detected objects are ascertained with regard to the vehicle, the change over time of the reflection point of the radar beam on the object and classification of the detected object being determined as a function of the change over time of the reflection point.

16 Claims, 3 Drawing Sheets

U.S. PATENT DOCUMENTS

2008/0129546 A1 * 6/2008 Manor ................. 340/936
2008/0278366 A1 * 11/2008 Behrens ............... 342/109

FOREIGN PATENT DOCUMENTS

| EP | 1 369 705 | 12/2003 |
| EP | 1 431 776 | 6/2004 |
| EP | 1 557 693 | 7/2005 |
| EP | 1 557 694 | 7/2005 |
| WO | WO 99/27384 | 6/1999 |
| WO | WO 99/36796 | 6/1999 |
| WO | WO 03/019234 | 3/2003 |

* cited by examiner

RADAR SENSOR AND METHOD FOR DISTANCE AND CRUISE CONTROL

FIELD OF THE INVENTION

The present invention relates to a radar sensor and an associated method for distance and cruise control of a motor vehicle by which objects in front of the vehicle in the direction of travel are detected and at least the distance, relative velocity, and azimuth angle variables of the recognized objects with respect to the vehicle are ascertained, the change over time of the reflection point of the radar beam on the object being ascertained and a classification of the detected object being ascertained as a function of the change over time of the reflection point.

BACKGROUND INFORMATION

A radar sensor for adaptive distance and cruise control is described in the publication "adaptive Fahrgeschwindigkeitsregelung ACC" [Adaptive cruise control ACC] published by Robert Bosch GmbH, April 2002 (ISBN-3-7782-2034-9). The radar sensor emits radar beams and receives partial beams reflected back by objects within the sensor coverage area and carries out a cruise control in the sense of controlling a constant distance as a function of the measured relative velocity and the distance of objects ahead and, in the absence of objects ahead, carries out a cruise control in the sense of controlling a constant velocity.

A disadvantage of radar sensors for distance and cruise control is that the reflection points of the detected objects which reflect back the emitted radar beam are variable, depending on the angle of observation, and thus the reflection points of the objects ahead may migrate constantly on the object. This results in a measurement inaccuracy which is superimposed on the measured variables of distance d, azimuth angle $\phi$ of the object with respect to the main axis of the sensor, and relative speed $v_{rel}$ as measuring errors which are manifested in a statistical noise of these measured variables.

SUMMARY

In accordance with example embodiments of the present invention, a device and a method by which the disadvantages of the related art are overcome by ascertaining the measuring errors for distance d, relative velocity $v_{rel}$, and azimuth angle $\phi$ so that more precise object tracking is implementable and an object classification may be performed on the basis of the size and the change over time of the reflection migrations and/or the number of reflection points per detected object, this object classification advantageously also being usable again for a more precise prediction of object position.

In accordance with an example embodiment, the spatial extent of the change of the reflection point is advantageously detected over a predetermined period of time. This makes it possible to infer the size of the object on the basis of object migrations that are variable over time and also makes it possible to perform an object classification in which the objects that are recognized are classified with regard to size.

In addition, it may be advantageous if the spatial extent is ascertained on the basis of changes over time in the azimuth angle of the reflection point. It may also be advantageous if the number of reflection points on the object is also analyzed for classification of the object. Thus, objects in the form of trucks will have a larger number of reflection points because they have a larger reflective surface and in most cases also have a more fractured surface than passenger vehicles, so there may be more reflection points than in the case of passenger vehicles.

It may also be advantageous if the instantaneous position of the recognized objects is calculated in advance from a previously ascertained object position and a previously ascertained relative velocity of the object and the spatial change of the reflection point is ascertained from the deviation in the instantaneous object position and the one calculated in advance. If reflection migration occurs during the previously ascertained object reflection and the instantaneous object reflection, i.e., if the reflection point on the object changes, the result is a movement in addition to the variable object position, this movement being measurable due to the migration of the reflection. By ascertaining the deviation between this object position calculated in advance and the ascertained reflection position, it is possible to ascertain the spatial extent of the reflection migration if both reflection points belong to the same object. Since in the case of reflection migration, the measured relative velocity hardly undergoes any change and the reflection point is able to jump to the object surface only within a certain range, object migrations and multiple object reflections may be assigned to this one object, and it is possible to infer the size of the object detected ahead by analyzing the migration of the reflection.

It may also be advantageous if the objects are assigned to one of the object classes as part of the object classification, i.e., passenger vehicles, trucks, two-wheeled vehicles, manhole covers, or other objects. From ascertainment of the extent of the object, it is possible to assign the recognized objects to one of the aforementioned object classes, so that an advance calculation of future object positions may be performed with higher precision because objects of the two-wheeled vehicle object class, for example, may have greater transverse speeds than objects assigned to the truck object class, for example.

It may also be advantageous if objects which have already been assigned to an object class are assigned to a different object class in a subsequent measuring cycle because a measured reflection migration on the object allows the inference that the object reflection surface is larger than would be possible according to the previously assigned object class. It is thus appropriate to transfer objects classified as two-wheeled vehicle objects to the object class of passenger vehicles or to transfer objects previously classified as passenger vehicles to the object class of trucks. A change in object class in the opposite direction, the object class being altered in the sense that it characterizes objects having smaller reflective surfaces and/or a change in object class from truck to passenger vehicle or from passenger vehicle to two-wheeled vehicle, is not appropriate because objects of an object class for which a large reflective surface has already been ascertained such as trucks would not necessarily result in a large reflection migration at a later measurement time.

It may also be advantageous if the deviation between the instantaneous object position and the one calculated in advance is Kalman filtered.

In addition, it may be advantageous if the Kalman-filtered deviation and/or the ascertained object class is used for a more accurate advance calculation of the future position of the object recognized from the instantaneously ascertained object position and the instantaneously ascertained relative velocity of the object.

Implementation of the method according to the present invention in the form of a control element provided for a control unit of an adaptive cruise control of a vehicle is of particular importance. A program that is capable of running on a computer, in particular on a microprocessor or signal processor, and is suitable for execution of the method according to the present invention, is stored in the control element. Thus, in this case, the present invention is implemented by a program stored in the control element so that this control element equipped with the program represents the present invention in the same way as does the method which is suitably executed by the program. An electric memory medium, e.g., a read-only memory, may be used in particular as the control element.

Other features, possible applications, and advantages of the present invention may be derived from the following description of exemplary embodiments of the present invention which are depicted in the figures. All the features described or depicted here either alone or in any combination constitute the object of the present invention, regardless of how they are combined.

BRIEF DESCRIPTION OF THE DRAWINGS

Exemplary embodiments of the present invention are explained in greater detail below on the basis of figures.

DESCRIPTION OF EXAMPLE EMBODIMENTS

Figure 1:
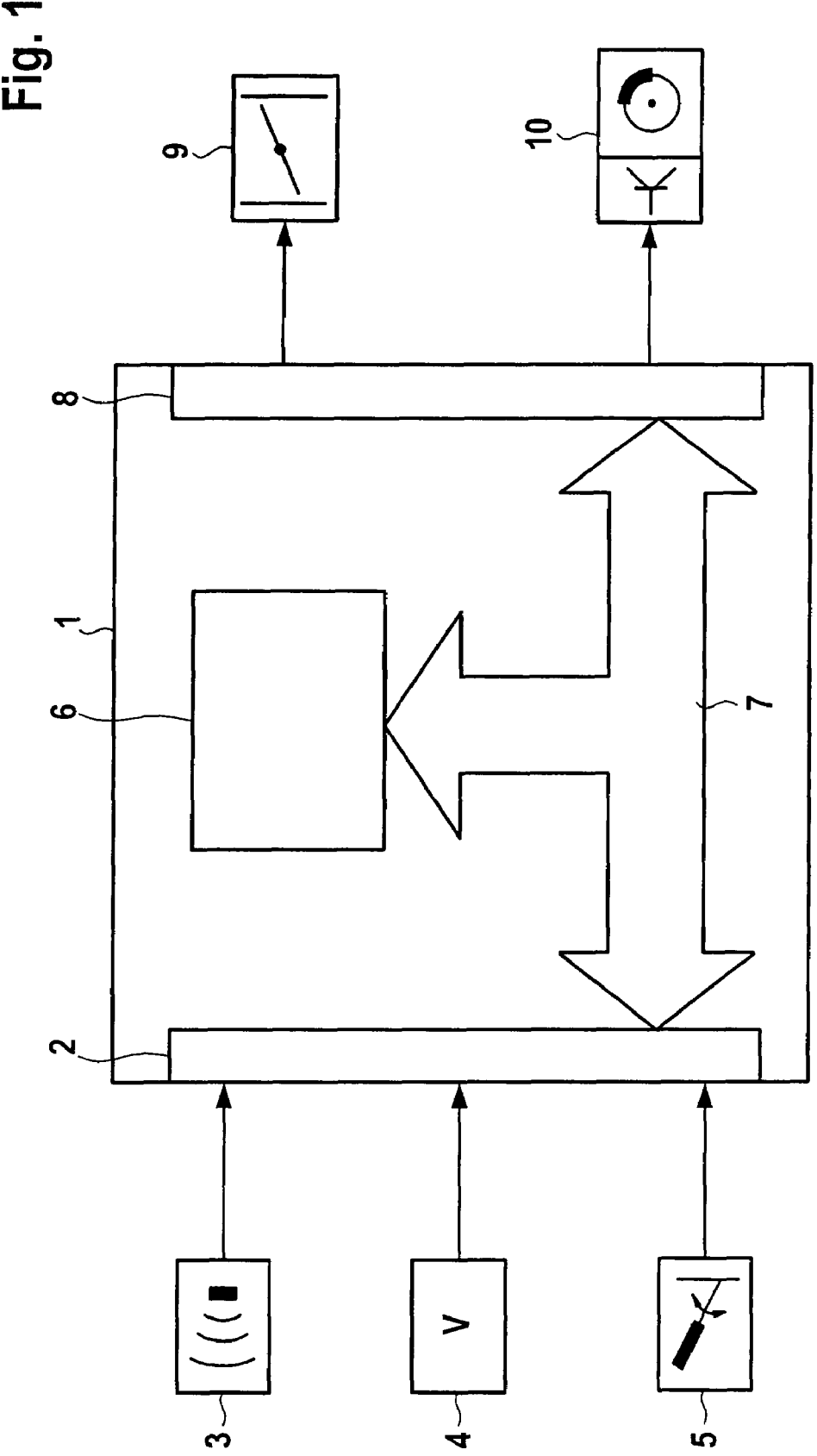
FIG. 1 shows a schematic block diagram of an example embodiment of the device according to the present invention.

FIG. 1 shows a distance and cruise control device 1 having, among other things, an input circuit 2. Input signals may be supplied to distance and cruise controller 1 via input circuit 2. Measured variables of an object sensor 3, which may be implemented as a radar sensor or laser sensor, for example, are provided as input signals. These object sensors 3 emit electromagnetic waves, which are reflected by objects ahead and whose reflected partial beams are received by object sensors 3, distance d between the host vehicle and the object ahead, relative velocity $v_{rel}$ of the object ahead with respect to the host vehicle, and azimuth angle $\phi$ of the object ahead with respect to the sensor main axis being ascertained on the basis of the signal transit time of the electromagnetic waves and the Doppler shift of the transmission signals. These measured variables are sent to input circuit 2 with respect to each reflection point on objects within the sensor coverage area. It is possible here for one or more reflection points to be measured per detected object. It is possible to determine whether multiple reflection points belong to a single object on the basis of approximately identical relative velocity $v_{rel}$ for the various reflection points and on the basis of approximately identical azimuth angles $\phi$ and distances d. In addition, a velocity signal v representing the speed of the host vehicle is sent from a speed sensor 4 to input circuit 2. It is possible in this way to convert the relative velocity measured and made available by object sensors 3 to absolute values. In addition, signals of an operator device 5 by which the driver of the vehicle is able to activate and deactivate the distance and cruise controller and is able to make changes in driver-specific system settings to adjust distance and cruise controller 1 to conform to the driver's wishes may also be sent to input circuit 2. The input signals supplied to input circuit 2 of distance and cruise controller 1 are relayed by a data exchange device 7 to a calculation unit 6. Calculation unit 6, which may be designed as a microprocessor or signal processor, for example, ascertains output signals that may be output to downstream final control elements from the input signals supplied to them. The example method according to the present invention may be implemented, for example, as stored program code in calculation unit 6 in which the input signals are processed by the example method according to the present invention. Calculation unit 6 ascertains control signals that are relayed via data exchange device 7 to output circuit 8 as a function of the input signals supplied to it. Output circuit 8 relays these actuator signals to downstream control elements, and in the case of a calculated need for acceleration, a performance-determining final control element 9 of an internal combustion engine may be triggered. Performance-determining final control element 9 of the drive device may be implemented as an electrically controllable throttle valve, for example, or as an electrically controlled fuel metering device of a fuel injection system. If calculation unit 6 finds that there is a need for deceleration of the host vehicle, output circuit 8 relays actuator signals to deceleration devices 10 of the vehicle. These signals are relayed to the vehicle brakes via an electrically controllable braking force amplifier, thereby decelerating the vehicle in accordance with the actuator signals.

Figure 2:
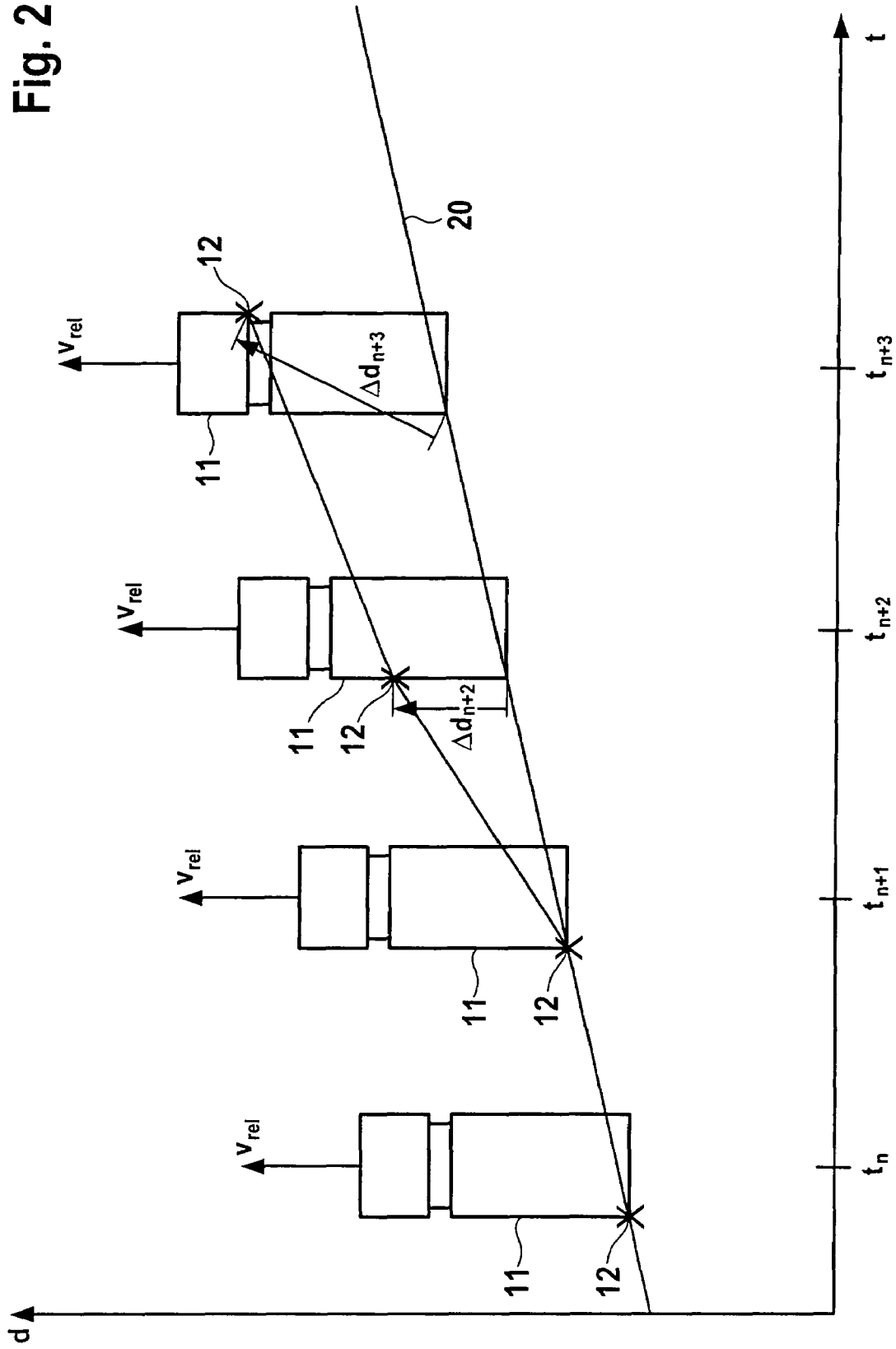
FIG. 2 shows a distance-time diagram to illustrate the example method according to the present invention.

FIG. 2 shows a distance-time diagram of a driving situation. A truck 11 traveling ahead is indicated schematically at various successive points in time $t_n$, $t_{n+1}$, $t_{n+2}$ and $t_{n+3}$. This truck is moving at a certain distance d, which is plotted on the basis of the coordinate axis, ahead of the host vehicle at relative velocity $v_{rel}$. Transmission signals are emitted by object detection sensors 3, reflected at reflection point 12 (marked with an x) on truck 11 traveling ahead, and received by the object sensors. In the example illustrated here, truck 11 is traveling at relative velocity $v_{rel}$ which is greater than the host vehicle's velocity v, so that truck 11 is moving away from the host vehicle progressively over time t, growing distance d increasing linearly as a function of time t in this example, as represented by straight line 20. The transmitted microwave signal is reflected at reflection point 12, for example, on the left rear corner of truck 11. At point in time $t_{n+1}$, truck 11 has moved away from the host vehicle in which the sensor is installed because of relative velocity $v_{rel}$ of the truck, so that distance d has increased. At this point in time, the transmission signal is still reflected by the left rear corner of truck 11, so that the reflection point remains unchanged in relation to point in time $t_n$. Because the probable retention time for point in time $t_{n+1}$ has been calculated in advance based on the measured relative velocity and the object position at point in time $t_n$, a comparison may now be performed at point in time $t_{n+1}$ between the object position calculated in advance and the object position ascertained at point in time $t_{n+1}$. Since reflection point 12 has remained unchanged during these two times, the deviations between the calculated and measured position are very minor, so that the deviation is very minor. At another point in time $t_{n+2}$ the reflection point migrates on truck 11 traveling ahead, for example, which has been recognized as an object. In this case, the left side of truck 11, for example, has been shown as reflection point 12.

An advance calculation of the object position for point in time $t_{n+2}$ was calculated on the basis of relative velocity $v_{rel}$ and distance d plus azimuth angle $\phi$ at point in time $t_{n+1}$ and this object position at point in time $t_{n+2}$ which was calculated in advance is compared with the actually measured object position of reflection point 12, making it possible to ascertain the deviation between these two values. Since radar reflection point 12 has migrated by distance $\Delta d_{n+2}$ on the object between point in time $t_{n+1}$ and point in time $t_{n+2}$, the deviation between the object position calculated in advance and the actually ascertained object position is much greater for point in time $t_{n+2}$ because the reflection migration by distance $\Delta d_{n+2}$ has additionally been added. The time correlation in the deviation of the instantaneously measured object position and the one calculated in advance is analyzed in particular. Reflection migration is characterized by a large time-correlated error between these two values. This is manifested as if a low-frequency signal were superimposed on the measured values. Generally, a measuring noise is not correlated, so that reflection migration is detectable by a correlation analysis and the existing measuring noise does not affect the object classification. Thus the large time-correlated error is recognizable via the correlation of the instantaneously measured object position with the one calculated in advance and may then be used for object classification.

By ascertaining this object migration distance, it is also possible to infer the size of the object because larger reflection migrations are possible on a truck, labeled with reference number 11 in FIG. 2, than on a passenger vehicle or a two-wheeled vehicle. A future object position for point in time $t_{n+3}$ is in turn calculated in advance and calculated at point in time $t_{n+3}$ from the measured object position and relative velocity $v_{rel}$ of truck 11 at point in time $t_{n+2}$. For example, radar reflection point 12 on truck 11 has jumped again, with radar reflection point 12, indicated by an x, now being detected on the right rear corner of the driver's cab of truck 11, which is indicated schematically. At point in time $t_{n+3}$ a calculation of the deviation between the object position calculated in advance and the actually determined one may be performed based on the ascertained object position and the one calculated in advance, radar reflection point 12 on object 11 being varied by distance $\Delta d_{n+3}$ in comparison with the radar reflection points at points in time $t_n$ and $t_{n+1}$ at this point in time. In ascertaining the deviation between the calculated and ascertained object positions, it is possible that the radar reflection points may have a great deal of uncertainty on large objects in particular because trucks offer larger surfaces for radar reflection than passenger vehicles do. Furthermore, it is also possible to analyze the number of reflection points, only one radar reflection point 12 being depicted in FIG. 2 per point in time.

Figure 3:
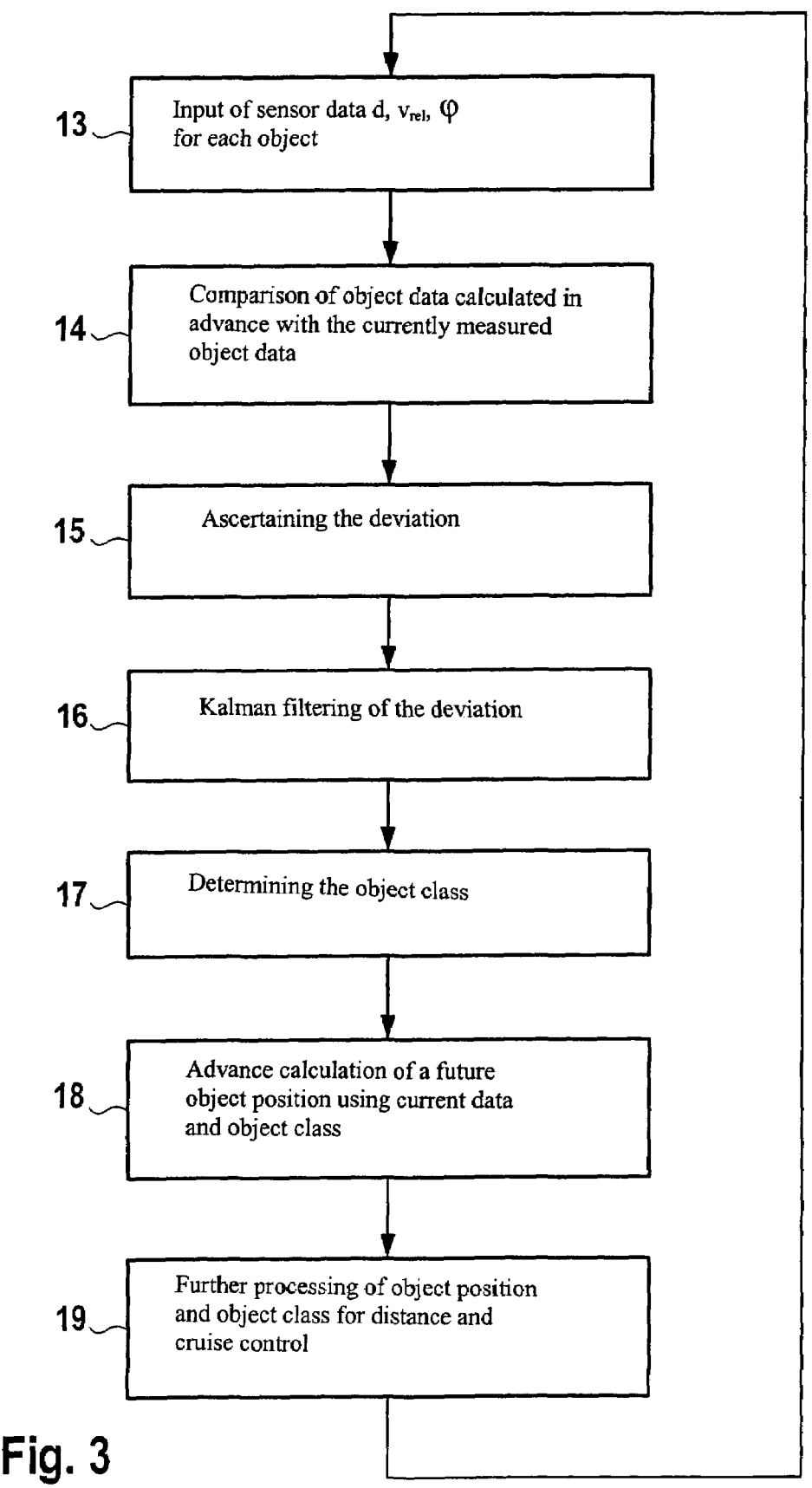
FIG. 3 shows a flow chart of an example embodiment of the method according to the present invention.

FIG. 3 shows a schematic flow chart of the example method according to the present invention. It begins in step 13, when the sensor data input for each object includes distance d between the host vehicle and the detected object, relative velocity $v_{rel}$ of the detected object with regard to the host vehicle velocity, and azimuth angle φ of the object with regard to the main axis of the sensor. In the following step 14, this sensor data is compared with data determined from the previous measuring cycle and calculated in advance using a dynamic driving model in the instantaneous measuring cycle. The deviation between the object position calculated in advance and the currently measured one is ascertained in subsequent step 15. According to a preferred embodiment, it is possible according to step 16 to subject the deviation in the ascertainment between the calculated and measured object positions to Kalman filtering. In next step 17, the size of the deviation and the distance of the radar reflection migration on the object are used to determine the object class. In doing so, objects on which radar reflection points are very close together are identified as point objects, e.g., a manhole or a beverage can, or in the case of a somewhat greater extent of the deviations in the measured radar reflection points and those calculated in advance, the object may be identified as a two-wheeled vehicle. For object classification, it is also advantageously possible to analyze the number of simultaneous reflection points on an object, a larger object class being inferred, the greater the number of reflection points appearing simultaneously on an object. With an increase in the spatial distribution of the radar reflection points on the object, this object may also be classified as a passenger vehicle or even as a truck. If the spatial distance of the radar reflections is greater than has been the case since the start of detection of the object, a change in the object class is possible, so that a passenger vehicle may now be detected as a truck, for example, or a two-wheeled vehicle may be detected as a passenger vehicle, so that a change in object class from an object class of a smaller spatial extent to an object class of a larger spatial extent is possible. Thus, only the converse object classification is not meaningful because an object that has already been identified as a truck and has already had a large spatial extent of the radar reflection migrations may not be classified with certainty as a passenger vehicle Pkw on the basis of a current object position measurement which is close to previous radar reflection points, because it has previously already been classified as a truck and therefore need not necessarily have radar reflection points 12 that are far apart in each measurement. In a subsequent step 18, a future object position for each detected object is calculated in advance from the current sensor data, with the current sensor data and possibly even the object class being used for this purpose. On the basis of the object class, it is possible to specify dynamic limits, so that a two-wheeled vehicle in the form of a motorcycle, for example, may have a high lateral transverse acceleration with regard to the host vehicle, but this transverse acceleration is lower in the case of a truck. On the basis of the ascertained object class, it is therefore possible to adjust accordingly the driving dynamic model with which future object data for the next measuring cycle is calculated on the basis of the instantaneous object data. In next step 19, the ascertained object position and optionally the object class are forwarded to the downstream regulating function for distance and cruise control which controls the velocity of the host vehicle on the basis of the obtained sensor data.

After step 19, the method begins again at step 13 and repeats.

What is claimed is:

1. A radar sensor for distance and cruise control of a motor vehicle, comprising:
    an arrangement configured to detect objects in front of the vehicle in a direction of travel and to ascertain at least a distance, a relative velocity, an azimuth angle of a recognized object with regard to the vehicle, and a position of a reflection point of a radar beam on the object,
    the arrangement further configured to ascertain a positional change in time of the reflection point of the radar beam on the object, and to ascertain a classification of the object as a function of the positional change in time of the reflection point.

2. The radar sensor as recited in claim 1, wherein the arrangement is further configured to ascertain a spatial extent of a change in the reflection point over a predetermined period of time.

3. The radar sensor as recited in claim 2, wherein the arrangement is further configured to ascertain the spatial extent based on changes over time in an ascertained azimuth angle of the reflection point.

4. The radar sensor as recited in claim 1, wherein the arrangement is further configured to calculate an instantaneous position of the object in advance from a previously ascertained object position and a previously ascertained relative velocity of the object, and to ascertain a spatial change of the reflection point from a deviation between the instantaneous object position and the object position calculated in advance.

5. The radar sensor as recited in claim 4, wherein the arrangement is further configured to compare an instantaneous position of the object with the instantaneous position of the object calculated in advance and to use a resulting difference from the comparison for object classification.

6. The radar sensor as recited in claim 1, wherein the arrangement is further configured to analyze a number of reflection points on the object for classification of the object.

7. The radar sensor as recited in claim 1, wherein the arrangement is further configured to assign the object to one of the following object classes: passenger vehicle, truck, two-wheeled vehicle, manhole cover, guard rail, or other objects as part of the object classification.

8. A method for distance and cruise control of a vehicle comprising:
   detecting an object in front of the vehicle in a direction of travel using a radar sensor;
   ascertaining at least a distance, a relative velocity, an azimuth angle of the recognized objects with regard to the vehicle; and a position of a reflection point of a radar beam on the object;
   ascertaining a positional change over time in the reflection point of the radar beam on the object; and
   ascertaining a classification of the detected object as a function of the positional change over time of the reflection point.

9. The method as recited in claim 8, wherein a spatial extent of the change of the reflection point is detected over a predetermined period of time.

10. The method as recited in claim 9, wherein the spatial extent is ascertained based on changes over time of ascertained azimuth angle of the reflection point.

11. The method as recited in claim 9, wherein an instantaneous position of the object is calculated in advance from a previously ascertained object position and a previously ascertained relative velocity of the object, and the spatial extent of the change of the reflection point is ascertained from a deviation in a instantaneous object position and the instantaneous calculated in advance.

12. The method as recited in claim 11, wherein the deviation in the instantaneous measured object position and the instantaneous position calculated in advance is compared and a resulting difference from the comparison is used for object classification.

13. The method as recited in claim 8, wherein a number of reflection points on the object is analyzed for classification of the object.

14. The method as recited in claim 10, wherein the object is assigned to one of the following object classes: passenger vehicles, trucks, two-wheeled vehicles, manhole covers, guard rails, or other objects as part of an object classification.

15. The method as recited in claim 11, wherein a deviation in the instantaneous object position and the instantaneous object position calculated in advance undergoes Kalman filtering.

16. The method as recited in claim 15, wherein at least one of a Kalman filter deviation and the ascertained object class is used for more accurate advance calculation of a future position of the object from the instantaneously ascertained object position and the instantaneously ascertained relative velocity of the object.

* * * * *